United States Patent [19]

Leiber

[11] Patent Number: 4,678,243

[45] Date of Patent: Jul. 7, 1987

[54] METHOD AND APPARATUS FOR CONTROLLING BRAKE PRESSURE IN VEHICLE BRAKE SYSTEMS

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 800,570

[22] Filed: Nov. 21, 1985

[30] Foreign Application Priority Data

Dec. 8, 1984 [DE] Fed. Rep. of Germany ....... 3444827

[51] Int. Cl.$^4$ .............................................. B60T 8/02
[52] U.S. Cl. .................................... 303/114; 303/109; 303/114
[58] Field of Search ............... 303/113, 114, 110, 103, 303/106, 109, 119

[56] References Cited

U.S. PATENT DOCUMENTS

| 3,827,759 | 8/1974 | Belart ................................... 303/114 |
| 4,033,635 | 7/1977 | Montoya ............................ 303/109 |
| 4,285,042 | 8/1981 | Ohmori et al. .................. 303/109 X |
| 4,462,642 | 7/1984 | Leiber ................................. 303/119 |
| 4,523,792 | 6/1985 | Belart et al. ..................... 303/119 X |

Primary Examiner—Duane A. Reger
Assistant Examiner—Matthew C. Graham
Attorney, Agent, or Firm—Edwin E. Greigg

[57] ABSTRACT

A method and an apparatus for controlling characteristic curves in a vehicle brake system having a hydraulic brake booster. At least one supplementary piston is incorporated in the output pressure lines forming preferably closed brake circuits of the brake booster, the supplementary piston being triggered in a regulated manner both for controlling or varying the characteristic curve for anti-skid braking pressure modulation. Optionally, in order to attain predetermined characteristic curve courses, modified travel magnitudes of the brake pedal actuation or of the booster piston are compared with the actual pressure in the brake circuits. The triggering is effected via the magnetic valves.

28 Claims, 3 Drawing Figures

METHOD AND APPARATUS FOR CONTROLLING BRAKE PRESSURE IN VEHICLE BRAKE SYSTEMS

BACKGROUND OF THE INVENTION

The invention is directed to an improved method and apparatus for controlling brake pressure in, and/or adapting brake pressure to, predetermined vehicle brake systems.

Known vehicle brake systems (German Offenlegungsschrift No. 32 37 659) have a tandem master cylinder with main pistons disposed in it, which in order to generate brake pressure are displaceable by means of a pedal via a tappet, for instance with the aid of a booster; two brake circuits and valves incorporated in them and each associated with one or two wheel brakes are provided, so as to be directed out of the normal position into a pressure reduction position if a braked wheel associated with them is in danger of locking, or skidding. This known vehicle brake system operates on the principle of direct pressure feeding from the pressure source. To attain an anti-skid or anti-locking (also known as ABS) function, the particular branch of the brake circuit located between the wheel brake and the valve is temporarily opened, causing pressure medium to flow out of the brake circuits so that the brake pressure drops in the desired manner. Once any danger of locking is past, then the pressure medium that has flowed out is replaced by feeding in pressure medium that has been kept ready, under pressure, by a pressure supply means. This known vehicle brake system requires a complicated electronic monitoring device, which prevents the valves from being directed into their pressure reduction position if the pressure supply should fail during an anti-locking situation.

In a further known hydraulic brake booster (German Offenlegungsschrift No. 28 25 087) equipped with an integrated anti-skid apparatus, the brake booster performs a dual function: not only boosting the braking force but also modulating pressure for anti-skid performance as well. For this pressure modulation, a particular valve circuit is used, together with a special brake booster structure in which the master cylinder of the brake booster is used for pressure modulation.

It is typical for these so-called integrated ABS systems that the integration includes the functional dual utilization of the brake booster both for boosting and for pressure modulation in the case of ABS functions. In such systems, the brake booster should have a short structural length, and in the event of pressure supply failure, a translation jump should occur, while if a brake circuit fails the brake pedal should not drop to the floor, and if at all possible there should be some indication of brake circuit failure and improper bleeding. Further objectives in such integrated systems are a perceptible, yet not overly strong, feedback at the brake pedal if an ABS function comes into play, as well as the inherent safety of the overall concept, which assures the functioning of both the brake booster and the brake circuits if individual components taking part in the function should fail, and does so without any additional monitoring circuit.

To meet these demands, hydraulic brake boosters with and without travel simulators for the brake pedal are possible; however, in order to be able to satisfy the above conditions, either the construction cost of the brake booster, with additional sensors and monitoring circuits, in systems operating with travel simulators, will be relatively high, or else major structural modifications of the brake booster must be made and it must be provided with additional pistons. A disadvantage shared by both types of systems is that such systems must necessarily be adapted to various vehicle types in terms of their design and basic function as well as in terms of their dimensions, so that many different master brake cylinder systems are necessary, with the attendant problems in terms of maintaining a varied inventory, not the least of which is the resultant expense thereof.

There is accordingly a need for a hydraulic brake booster concept which preferably uses an identical or perhaps conventional brake booster design and is in a position to be adapted in such a way to various external conditions of the vehicle or of a given braking event, taking ABS functions into account as well, as to enable the predetermining of arbitrary characteristic curves in the form of set-point courses of the brake pressure triggered at a given time, for instance via the pedal travel.

OBJECT AND SUMMARY OF THE INVENTION

It is a principal object of the invention that by means of at least one additional piston, a control of the characteristic curve of the brake pressure as a function of the brake pedal travel, or of the travel of the booster piston in the brake booster, is attainable allowing a virtually arbitrary, even nonlinear, course, within wide limits.

It is another object of the invention that a vehicle manufacturer can use specific, uniform brake boosters which meet his particular needs and specifications, and at the same time, it is possible to make a desired adaptation not only to various external factors (e.g., vehicle type) but also to various operational states by means of the shape of the characteristic curve, which is for instance attained by varying set-point curve courses.

It is a further object of the invention that at least one additional piston, preferably one per brake circuit, is subjected to a genuine regulation, or feedback control process, which as a function of appropriate operating parameters for the particular brake circuit furnishes, or withdraws, an additional volume of pressure medium.

It is yet another object of the invention that pressure modulation for ABS functions be in combination with an (hydraulic) arresting of the brake booster or of the brake pedal actuation; the regulation is effected by detecting the pressure prevailing at the supplementary piston, as supplied to the individual wheel brake cylinders, and comparing it with transducer signals, for instance of the pedal travel or the booster piston travel. Accordingly, magnetic valve assemblies acting upon the supplementary piston are triggered electrically, preferably with a clocked signal, and then by means of the particular duty cycle of the triggering, the desired set-point pressure value can be reproduced.

It is still another object of the invention that the individual brake circuits do not need to be opened, for instance to raise (or lower) the pressure in them, as is the case in systems with pressure feeding.

It is yet still another object of the invention to regulate the supplementary piston, so as to realize a predetermined pedal characteristic which is variable within wide limits, which on the other hand simultaneously enables the use of the same apparatus for a wide assortment of vehicles, in which the pedal characteristic is then uniformly adjustable even though the hydraulic brake booster is susceptible to use upon a great number of the most varied kinds of vehicle.

It is yet a further object of the invention to assure a translation jump in the event of pressure supply failure, enabling a brake circuit failure or improper bleeding to be indicated, and either prevents or lessens the drop of the pedal if a brake circuit fails.

It is still a further object of the invention to process transducer signals in the electrical range, by pre-specifying particular set characteristic curves, on the one hand, and on the other of processing appropriate parameters with variable characteristic curves, depending on the manner in which these parameters arise, for braking or ABS functions. For instance, in the case of high pedal speeds the processing of the derivation of the signal furnished by a brake pedal transducer (differentiation) can be used to establish steeper pedal characteristics, which means that shorter rise times are possible, because the immediate reaction of a variable characteristic curve shift means that a high pressure can be attained even with relatively short pedal paths.

Still another object of the present invention is that the additional volume of pressure medium made available by the supplementary piston in order to realize ABS functions in the various brake circuits can be exploited by triggering the same magnetic valve assemblies in a corresponding manner to that which during normal braking effects the pressure actuation of the regulated supplementary piston in order to control the characteristic curve. In the case of ABS functions, it is possible to feed in a higher brake pressure than would correspond to the pressure in the brake booster corresponding to the pedal force, doing so by means of the higher translation ratio of the supplementary pistons. Only if in the extreme case of the ABS functioning and the effect of the supplementary piston is no longer sufficient to assure the pressure build up and pressure reduction in the brake circuits by means of the supplementary piston volume do further magnetic valve assemblies come into play, which then directly take on the function of pressure modulation or pressure control via the brake booster.

Still other objects of the invention can be identified, such as the use of electric comparators, which at their output, by means of a yes/no function corresponding to the signals, present at their input for comparison, of actual pressure values at the wheel brake cylinders on the one hand and brake pedal travel or travel of the booster piston on the other, effect the clocked pressure triggering of the supplementary piston via corresponding magnetic valve groups. In addition, by adjusting the individual pulse links with respect to the pulse intervals (variation of the duty cycle) precisely predetermined set-point characteristic curve courses can be reproduced; on the other hand, sources of errors can be detected and indicated or displayed by evaluating the duty cycle.

The invention will be better understood and further objects and advantages thereof will become more apparent from the ensuing detailed description of preferred embodiments taken in conjunction with the drawings.

DESCRIPTION OF THE PREFERRED EMBODIMENTS

The basic concept of the present invention is to associate a regulatable supplementary piston with a hydraulic brake booster in at least one brake circuit I, II, which can preferably be a rod circuit. The supplementary piston furnishes an additional volume for the brake circuit and is itself selectively acted upon by pressure in accordance with predetermined parameters, preferably via magnetic valve groups which in turn are supplied with electric trigger signals based on predetermined parameters for attaining the characteristic curve courses for brake pressure over pedal travel, for instance, and other parameters evaluate an actual pressure value signal, by which means the circuit is closed. In this manner it is possible to generate variable characteristic curve courses within wide limits by means of characteristic curve generating blocks which can be added and expanded arbitrarily. These various characteristic curves with which the vehicle brake system then operates can also be matched to the particular vehicle, in the basic situation, and/or additionally varied by means of immediate reaction to specific operating states or situations during driving. Hereinafter only two such possibilities will be mentioned, namely the evaluation of the pedal actuation speed in order to shift the characteristic curve and the realization of better incorporation of ABS pressure modulations into the brake circuits.

Figure 1:
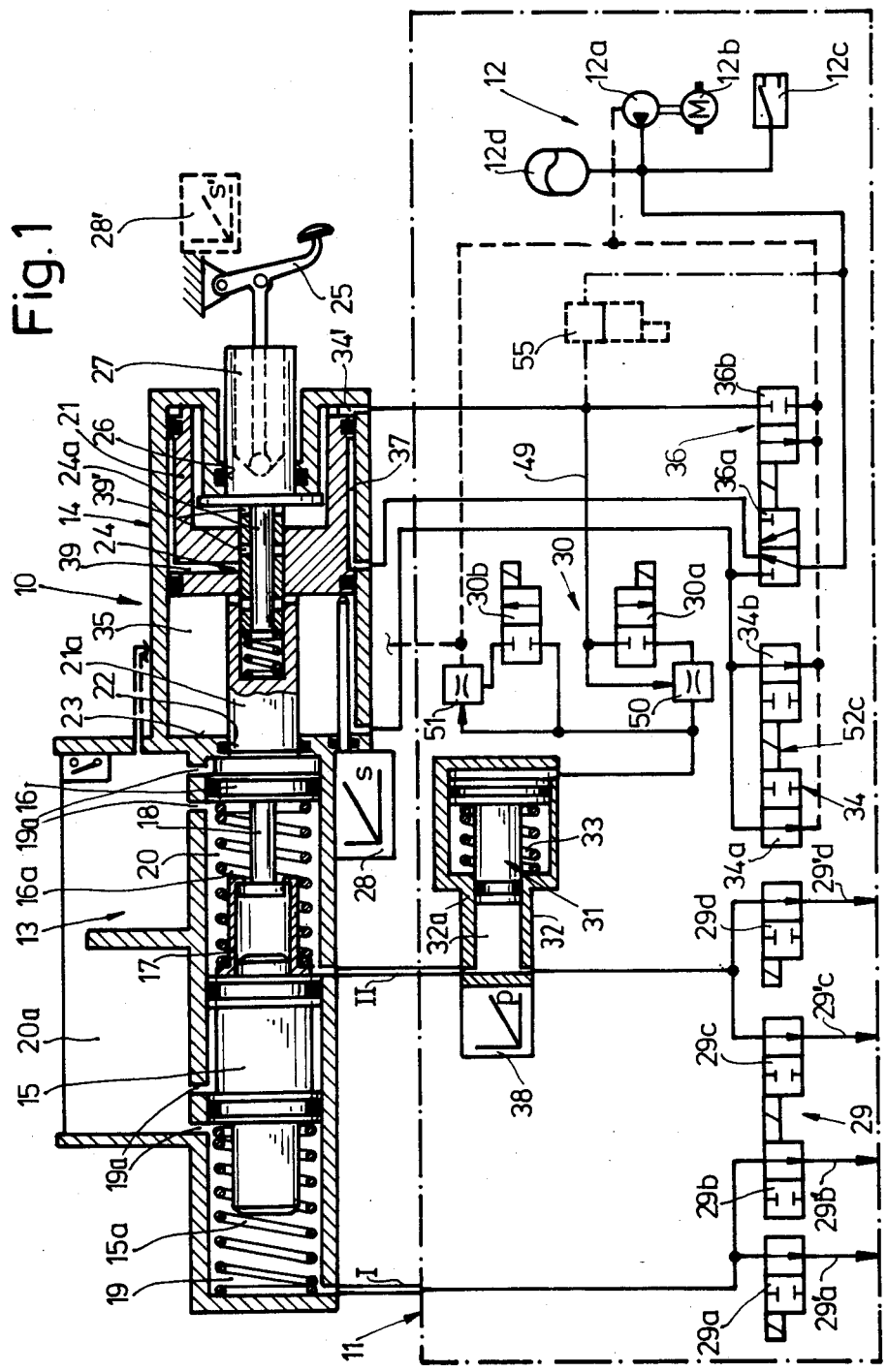
FIG. 1 shows a first exemplary embodiment of a hydraulic brake booster with a regulatable supplementary piston controlling the characteristic curve.

In the exemplary embodiment of the vehicle brake system having characteristic curve control shown in FIG. 1, three primary components are provided, namely the brake booster 10, a valve block 11 and the means for pressure supply 12, the pressure supply being embodied in a manner known per se and comprising a pump 12a with an electric motor 12b driving the pump, a pressure switch device 12c and a pressure reservoir 12d. The brake booster 10 can be of conventional design in principle; preferably, however, it has several particular structural and functional features corresponding to the embodiment shown in FIG. 1, which will be described briefly below.

The valve block 11 serves to impose the pressure of the pressure supply 12 upon the brake booster 10 and has supplementary components as will be described hereinafter which serve to control the characteristic curve or are used to realize ABS functions.

The overall conception of the hydraulic brake booster with variable characteristic curve control in accordance with the invention is completed by electric or electronic switching means, which based upon predetermined actual value signals, which are detected via sensors upon the operation of the components shown in FIG. 1, and predetermined courses of the characteristic curve, including characteristic curve data stored in memory and other operating parameters, which generate trigger signals and deliver them to the individual components comprising valve block 11, in this case magnetic valves in particular, in order to control at least one supplementary piston, which is regulated in its operating behavoir to furnish an additional volume of pressure medium for the brake circuits.

STRUCTURE OF THE BRAKE BOOSTER

The brake booster shown in FIG. 1 is understood to be purely by way of exemplary and does not restrict the use of the present invention; however, a brake booster 10 of this kind having the characteristics to be described hereinafter does prove to be particularly advantageous in combination with the present invention.

The brake booster is embodied as a tandem master cylinder 13, embodying the master brake cylinder portion, and an adjusting cylinder zone 14, embodying the booster portion. The tandem master brake cylinder 13 contains, in a main cylinder housing 14 which in this case is not stepped, a first main piston 15 with an associated compression spring 15a and a second main piston 16 with a compression spring 16a, which is supported on the first main piston 15, as well as a mechanical connection between these two main pistons, embodied by a pressure sleeve 17, which is secured on the first main piston 15 and oriented toward the second main piston 16, which sleeve receives a pressure rod 18 having an enlarged head. The pressure rod 18 slides in the pressure sleeve 17 gripped thereby in a sealing manner; the pressure rod 18 begins its extent at the second main piston 16. The pressure springs 15a and 16a push the two main pistons 15 and 16 into their starting positions shown in FIG. 1. In the starting positions, the respective pressure chambers 19 and 20 of the main pistons 15 and 16 communicate via expansion ports 19a with a supply container 20a for pressure medium.

In the exemplary embodiment of the adjusting cylinder or booster portion 14 shown in FIG. 1, the booster piston 21, which actuates the second main piston 16 through a sealed bore 22 of the adjusting cylinder bottom wall 23, surrounds the brake valve 24 in an annular manner, so that the brake valve 24 and the booster piston 21 are located in the longitudinal axis of the tandem master cylinder 13. The brake valve 24 is actuated by the brake pedal 25 via a pressure piece 27 travelling in a sealed guide 26 of booster piston 21. The structural make-up of the brake booster will be explained further later herein, in connection with its function.

Two actual value transducers are assigned to the brake booster 10, which can preferably be used alternatively, and include a travel transducer 28 or a pedal travel transducer 28' actuated by the booster piston 21, as shown in dashed lines in FIG. 1. The two main pistons 15 and 16, as will be understood from FIG. 1, act on closed brake circuits I and II which are also not opened if there is a change or adjustment of characteristic curve, as is otherwise required for a pressure feed in principle, so that the concept is error-proof from the outset.

Figure 2:
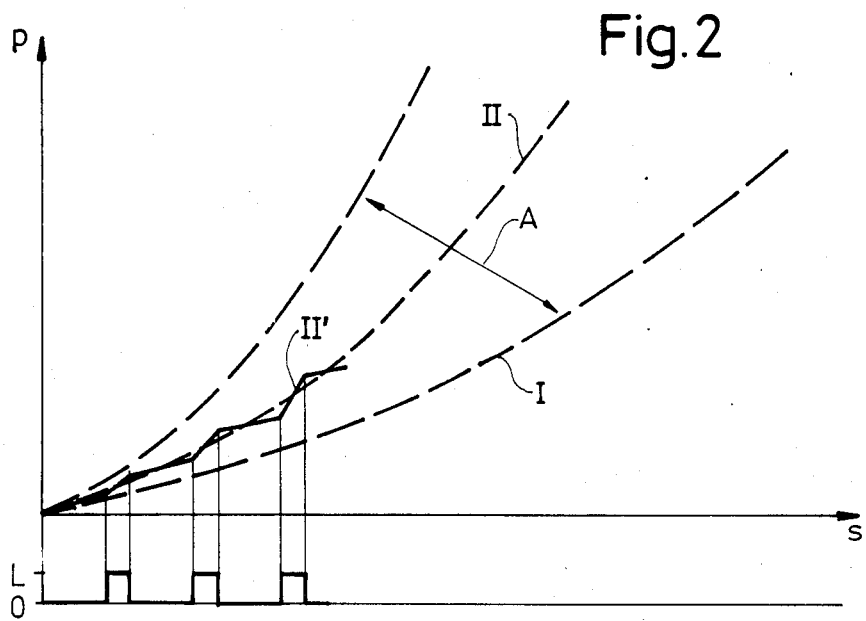
FIG. 2 shows various courses of the characteristic curves for brake pedal pressure, for instance over the brake pedal travel, in which the influence of the supplementary piston control also is clearly apparent.

If the supplementary piston, its pressure triggering and/or the pressure supply fail, then in the embodiments shown in FIG. 1 of a brake booster a translation jump takes place, and the driver has the feeling of a "longer pedal", that is, a longer pedal travel to generate a predetermined brake pressure (see also the curve course I in the diagram of FIG. 2, which includes a translation jump).

THE VALVE BLOCK

The valve block 11 includes 4 different valve groups, which serve particular primary purposes and can be used alone or in combination with the actuation of other valve groups.

A first magnetic valve group is marked 29 and includes 2/2-way magnetic valves 29a, 29b, 29c, and 29d, which as shown in the drawing are normally switched open, and in the case where ABS functions arise are controllable into their blocked positions, including selectively, by a corresponding electrical trigger means, in order to maintain pressure in the lines 29a to 29d leading to corresponding wheel brake cylinders. The 2/2-way magnetic valves 29a and 29b belong to the closed brake circuit I, while the 2/2-way magnetic valves 29c and 29d belong to the closed brake circuit II. The association of the pressure output lines 29a through 29d to the wheel brake cylinders can fundamentally be arbitrated; preferably the arrangement is such that one front wheel belongs to brake circuit I or II, so that for instance the two valves otherwise also shown by means of their common electrical triggering in the form of double magnetic valves 29b-29c, control the rear axle brake circuit; when one of the brake circuits I, II is associated with the rear axle or the front axle, it may be sufficient under favorable conditions for the two wheel brake cylinders to be associated with the rear axle in order to trigger a common 2/2-way magnetic valve.

A further magnetic valve group 30 includes two two-position magnetic valves 30a and 30b; via this magnetic valve group, the function of a respective supplementary piston 31 is regulated, which is secondarily incorporated, that is with its pressure chamber 32a, into the brake circuits I, II, which are now closed, thus, furnishing them an additional pressure medium volume from the operating pressure chamber to which piston 31 provides communication via the triggering magnetic valve group 30 with the booster chamber 34', in the booster housing portion 14 of the brake booster 10. Optionally, it may also be in communication with a separate pressure supply means. This supplementary piston 31 is preferably embodied in the form of a stepped piston in a cylinder housing 32, which is therefore stepped as well, such that it is slideably displaceable counter to the pressure of a prestressing spring 33, and therefore assures a pressure translation for the volume which it additionally makes available to the brake circuits I, II. In FIG. 1, only one supplementary piston 31 is shown and is assigned to the brake circuit II; it will be understood that correspondingly regulated supplementary pistons (described in further detail below) providing additional pressure medium volumes can also be assigned to all the brake circuits and partial brake circuits. As will be described in further detail below, the disposition of this supplementary piston 31 enables a characteristic curve shift, control, or predetermination; in general it enables a variation of the characteristic curves of the brake pressure generated by the system and supplied to the wheel brake cylinders via the brake pedal travel or, for instance, the booster piston travel within wide limits.

The structure of the valve block 11 is completed finally by a further magnetic valve group 34, which primarily assumes the control function over the pressure in the pressure chamber 35 of the booster piston 21, as well as by a magnetic valve group 36, which primarily serves to feed pressure to a peripheral annular chamber 37 in the booster housing portion 14, from which the pressure is delivered via corresponding conduits to the brake valve 24. The magnetic valve groups 34 and 36 each comprise 2/2-way magnetic valves 34a, 34b and 36a, 36b, respectively, which optionally or preferably may also be embodied as double valves with common electrical control and a common magnetic portion. To generate an electrical actual pressure signal, a pressure transducer 38 is assigned to the at least one supplementary piston 31 or the particular brake circuit in this case brake circuit II.

BRIEF DESCRIPTION OF THE MODE OF OPERATION

The particular advantage of the arrangement of a supplementary piston 31 in at least one (closed) brake circuit resides in the fact that it can be used not only for arbitrary characteristic curve variation, that is, for instance to adjust the characteristic curve based on particular operating conditions or to adapt itself to predetermined vehicle types and/or brake boosters, but simultaneously the task of realizing ABS functions, and finally, because of the evaluation of its own triggering data that can be performed, to recognize safety criteria. It is capable of indicating for instance, a brake circuit failure, improper bleeding of the brake circuits and the like.

The basic function will now be discussed briefly, initially without describing the mode of operation of the supplementary piston or the realization of ABS functions. Upon the actuation of the brake pedal 25, in order to build up brake pressure the brake valve 24 is moved in a known manner by displacing its control piston 24a, so that via transverse conduit 39 in the booster piston 21 and 39' and in the control piston 24a of the brake valve, the pressure from the pressure medium supply means prevailing in the peripheral annular chamber 37 reaches the rearward side of the booster piston, urging it to move. The resultant movement of the booster piston causes a corresponding movement of the main pistons 16 and 15 of the brake circuits I, II, which are so-called rod circuits, and causes a corresponding pressure build-up in the vicinity of the wheel brake. The resultant characteristic curve corresponds to the course I (FIG. 2) of brake pressure/adjusting travel of the brake pedal 25 or the booster piston 21. This characteristic curve, the course of which results from predetermined basic data of the brake booster, corresponds to a course without a supplementary volume furnished by the supplementary pistons for the particular brake circuit, but with a translation jump based on given structural characteristics of the design of the brake booster.

In the diagram of FIG. 2, A indicates the possible width of variation in the characteristic curve which can be realized by using the additional volume provided by the supplementary piston 31 in the brake circuit; the characteristic curve can then take arbitrary courses within this range, and specific predetermined set-point characteristic curve II during pressure build-up can also be reproduced by correspondingly matched triggering of the magnetic valve group 30 for the supplementary piston actuation. A supplementary form of realization for triggering the supplementary piston, in the case of the exemplary embodiment shown via the magnetic valve group 30, is schematically shown in FIG. 3 in the form of a block diagram.

The special electric trigger circuit for the magnetic valve group 30 can be considered in principle in terms of its mode of operation; thus, it can be an electronic logic circuit or a trigger system based on a microcomputer or microprocessor, which then also includes equally suitable storage or memory means, in order to prespecify desired set-point characteristic curve courses as an initial basis for later operation. Such set-point characteristic curve courses substantially serve to effect the adaptation, already mentioned, of the brake booster concept according to the invention to various different vehicle types and brake booster types, so that variable pedal characteristics can also be realized within wide limits, or a predetermined, identical desired pedal characteristic can also be maintained for a wide range of vehicle types.

Figure 3:
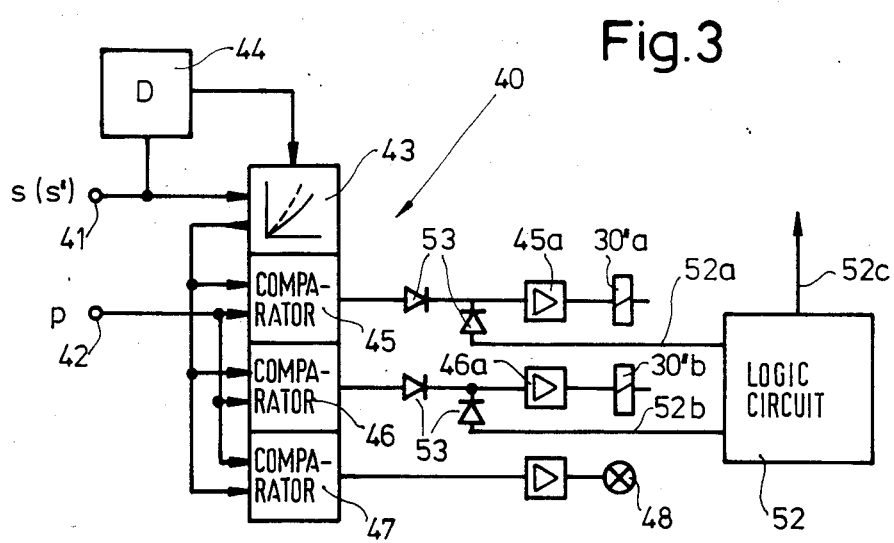
FIG. 3 shows a possible embodiment of an electric signal evaluation and trigger circuit for the magnetic valve groups associated with the supplementary piston.

The exemplary embodiment shown in FIG. 3 of an electronic signal evaluation and trigger circuit 40 includes the two inputs 41 and 42 for the actual value signals for travel s of the booster piston 21 derived from the transducer 28 or the travel s' of the brake pedal 25 derived from the transducer 28', as well as for the particular pressure P prevailing in the brake circuits I, II provided by the transducer 28. In order to attain a desired characteristic curve shape (characteristic curve course), a block 43 is provided, to which the travel signal s or s', for instance, when this signal is travel-proportional, is delivered and which from this and from correspondingly stored values provides a desired course of the characteristic curve of the travel magnitude, which may also be non-linear. Via the block 43, arbitrary characteristic curve set-point courses can therefore be determined and arbitrary components or circuits which generate the desired curve courses can be used, examples being analog characteristic curve generators, but also memories operating on a digital basis, which after being addressed with the appropriate travel variable emit a corresponding stored word for further processing.

In a further embodiment of the present invention, an evaluation of the pedal speed, that is the adjusting speed of the travel variable, has proved to be advantageous for supplementary characteristic curve shifting, for instance in the direction of a steeper curve characteristic, by which means the threshold time is decreased. Therefore a further block 44 is also supplied with the travel magnitude signal, and this is furnished to the characteristic curve shaping block 43 in the form of a differentiated signal as well. This makes it possible to take the pedal speed into account as well in establishing the course of the set-point characteristic curve.

The output variable of the characteristic curve shaping block, in this exemplary embodiment, reaches three (3) comparators, 45, 46, and 47, which compare the particular travel variable, modified in accordance with the desired characteristic curve course with the actual pressure value P at their respective other input. For instance, the comparator 45, perhaps via an intermediate amplifier 45a, can trigger the magnetic portion 30'a of the 2/2-way magnetic valve 30a, provided for the pressure build-up, of the magnetic valve group 30, while the comparator 46, via an amplifier arrangement 46a' triggers the magnetic portion 30b' of the 2/2-way magnetic valve 30b that is responsible for pressure reduction. The third comparator 47 then serves for instance to trigger a warning light 48, whenever upon following up the particular set-point characteristic curve a predetermined regulatory deviation has been exceeded. Since the triggering of the associated magnetic valve 30a, 30b, effected by the comparators 45 and 46 acts in the sense of regulation, then the regulatory deviation between the two input variables of actual pressure and modified travel variable is small, in any event when the system is intact and then does not exceed a predetermined threshold value at the comparator 47. If this threshold value is exceeded, then this is an indication that the desired set-point characteristic curve has not been attained. This is the case, for instance, when the supplementary piston or pistons 31 are no longer capable of furnishing further pressure medium, or in the case of brake circuit failure or poor leading of the brakes. In the same manner, the comparator 47 responds whenever there is a disruption in the magnetic valve group 30.

It will be understood that the characteristic curve shaping can also be effected immediately in the transducer area, for instance by using non-linear transducers, such as appropriately embodied potentiometers on the brake pedal 25. Therefore, if the regulatory deviation between the modified travel variable and the actual pressure exceeds a predetermined threshold value, then the comparator 46 responds and triggers the magnetic valve 30b for pressure reduction (drainage of the pressure medium, delivered to the trigger side of the supplementary piston 31, into the return line), while in the other case, via the magnetic valve 30a and the pressure line 49, additional pressure medium is delivered to the supplementary piston or pistons from the booster chamber.

In the diagram courses of FIG. 2 (showing the characteristic curve for actual pressure as a function of pedal travel/booster piston travel), the set-point curve II shows the effected course resulting from the supplementary piston triggering; in order for the pedal force characteristic to correspond to the desired set-point value, the supplementary piston 31 is switched into play if a pre-determined set-point characteristic curve fails to be attained, which failure is detected by the comparator 45; the operating pressure chamber 33 of the supplementary piston 31 thus furnishes pressure medium via the valve 30a, as a result of which additional pressure medium is also furnished to the associated brake circuit II until such time as the desired set-point value is attained. It should also be noted at this point that throttle means, preferable linear throttles 50, 51, are incorporated in the inflow to and return flow from lines of the supplementary piston 31, so that the variations in actual pressure value as a result of the supplementary piston do not take place abruptly, but rather gently, with the steepness of the rise or the drop being limited.

After the attainment of the set-point value, the further pressure increase is effected, solely via the booster piston 21, until there is again a failure to attain the set-point value and the supplementary supply via the supplementary piston again becomes necessary. A pressure course of this kind with an associated illustration of the electrical trigger voltage course for the supplementary piston is indicated at II′ in the diagram of FIG. 2 in thick solid lines.

The description thus far shows that even an appropriate evaluation of the pedal speed by differentiating the travel signal can be made and thus effected a more or less pronounced modification so that a correspondingly steeper characteristic curve can be realized, in order to improve the brake threshold time.

It will be understood that the just-described operation of an intermittent pressure increase, or pressure reduction as well, via the supplementary piston can be utilized to particular advantage for realizing ABS functions as well, that is, for an anti-skid brake system integrated in this manner, if the operation of the 2/2-way magnetic valve 30b is taken into account in addition. In FIG. 3, for purposes of supplementation and representing all possible forms of at least the electrical trigger circuit of an anti-skid brake system, an electrical logic circuit block 52 is shown, the structure of which may also be known in principle, and which is capable also of triggering the magnetic valve 30a, 30b for imposing pressure on the supplementary piston or pistons 31 via two trigger lines 52a, 52b. Diodes 53 incorporated into the control lines serve to effect mutual voltage isolation.

Therefore, if an ABS function begins, then preferably the procedure is such that first, via a separate further trigger line 52c, the magnetic valve group 34 is triggered, which then switches over and locks the booster piston 21.

The ABS pressure modulation (pressure build up and pressure reduction) then takes place primarily (and initially) via the magnetic valve group 30, and the already-described function of the supplementary piston upon the pressure in the brake circuits I, II associated with it is the result; upon the triggering of the 2/2-way magnetic valve 30b via the logic circuit 52, a pressure reduction takes place in the pressure medium supply or pressure medium triggering of the supplementary piston 31 so that pressure medium flows from it into the return line and a corresponding pressure reduction in the brake circuit takes place. In the same manner, by appropriately triggering the magnetic valves 30a, 30b, a quasi-analog effect for realizing a pressure maintenance function is also conceivable via the supplementary piston 31, including when the booster piston 21 is locked, if both magnetic valves 30a, 30b are switched into their blocking positions. A pressure build up in the brake circuits I, II is also possible by appropriately triggering the supplementary piston via the magnetic valve 30a for this ABS situation.

The ABS function can include two extreme cases, which with respect to the described function of the supplementary piston may possibly necessitate a greater pressure variation range than the supplementary piston 31 is capable of accomplishing for the ABS function. The two extreme cases relate to the appearance of asymetrical road surface conditions and a variation of the coefficient of adhesion between a particular wheel and the road surface.

For the first extreme situation, because of the locking of the booster piston 21, it is possible that the supplementary piston may not be able to furnish sufficient pressure medium for full braking of the particular wheel having the higher co-efficient of adhesion with an asymmetric road surface in accordance with the pedal force. This state can be detected, for instance, by the electric or electronic logic circuit 52 and leads to a shut off of the magnetic valve group 34, so that to further increase the brake pressure a movement of the booster piston 21 is initiated, until such time as the corresponding wheel is triggered in accordance with the booster pressure associated with the pedal force. The reactuation of the magnetic valve group 34 which effects the locking of the booster piston 21 is then likewise effected by corresponding logical signals.

The second extreme case of a discontinuity in the coefficient of adhesion, for instance from high to low, can have the effect that the withdrawal of volume from the associated brake circuit by the supplementary piston is insufficient compared with the pressure reduction required. In this case the magnetic valve group 36 is switched on, namely being switched over out of the position shown in FIG. 1 into the other position, so that pressure is withdrawn from the pressure chamber 34′ and is simultaneously delivered to the chamber 35 on both sides of the booster piston 21, so that this booster piston is correspondingly moved backward, with a corresponding pressure reduction in the brake circuit. It will be understood in this connection that in this case of a more or less predominating intervention of the ABS function on components of the brake booster itself, the valves belonging to the valve group 11 can be switched for maintenance either individually or as a group, wherever required as based on the evaluation of the wheel movement. The generation of appropriate trigger signals is effected via the logic circuit 52.

Finally, FIG. 1 also shows an additional 2/2-way magnetic valve 55 as a selective possibility, which with its connecting pressure lines is switched such that when triggered it can deliver the pressure medium from the supply source directly to the pressure side of the booster piston 21 in the booster housing portion 14; in other words it can build up a braking action even without the brake valve 24 being actuated. A pressure build up in the brake circuit in this manner takes place whenever the necessity for realizing so-called ASR FUNCTIONS (anti-slip regulation) appears.

All the characteristics included in the description and the ensuing claims and shown in the drawing can be essential to the invention both individually and in any desired combination with one another.

The foregoing relates to a preferred embodiment of the invention, it being understood that other embodiments and variants thereof are possible within the spirit and scope of the invention, the latter being defined by the appended claims.

What is claimed and desired to be secured by Letters Patent of the United States is:

1. A method for controlling and adapting brake pressure in a vehicle brake system, comprising the steps of:
   delivering a pressure medium to a hydraulic brake booster via a brake-pedal-actuated brake valve,
   supplying said pressure medium to at least one wheel brake cylinder via at least one brake circuit to create brake pressure therein,
   controlling a characteristic curve of said brake pressure selectively over at least one of a travel of a brake pedal and a travel of a booster piston in said brake booster,
   comparing signals representing said travel with a predetermined set-point characteristic curve to generate trigger signals,
   delivering said trigger signals to at least one magnetic valve in said at least one brake circuit, and
   varying said pressure medium to a supplementary piston incorporated between an input for pressure medium of the brake booster and said at least one wheel brake cylinder to selectively vary brake pressure from high to low in said at least one brake circuit independently of operation of the brake booster.

2. A method as defined by claim 1, further wherein said trigger signals actuate said at least one magnetic valve to supply pressure to the at least one supplementary piston and said trigger signals comprise a travel magnitude signal generated by comparing a desired characteristic curve course for brake pressure values with actual pressure values produced during vehicle operation.

3. A method as defined by claim 2, further wherein said step of comparing said desired characteristic curve course with said actual pressure value signals is performed at two separate points for pressure increase and pressure reduction, and the step of varying said pressure medium to the at least one supplementary piston is effected by supplying brake pressure via a first 2/2-way magnetic valve and by withdrawing said brake pressure therefrom via a second 2/2-way magnetic valve.

4. A method as defined by claim 3, further comprising the step of throttling said brake pressure supplied to said supplementary piston, preferably via linear throttles, to effect greater control over a speed at which said pressure increase and pressure decrease occur.

5. A method as defined by claim 1, further comprising the further step of predetermining values of the setpoint characteristic curve selectively in accordance with at least one of specific vehicle type and brake booster type, further modifying said curve by evaluating operational-dependent parameters, such as pedal speed, and reproducing said values by appropriate pressure triggering of the supplementary piston in said at least one brake circuit.

6. A method as defined by claim 1, further comprising the step of supplying said pressure medium to the at least one supplementary piston is effected from the booster chamber of the brake booster.

7. A method as defined by claim 1, further comprising the further step of using pressure prevailing in a chamber associated with the supplementary piston in a respective associated brake circuit to modulate brake pressure for anti-skid braking purposes by simultaneously and selectively locking at least one of the brake booster and the brake pedal.

8. A method as defined by claim 7, further wherein said prevailing pressure used for said anti-skid braking purposes is generated in the associated brake circuit via a boosting factor provided by the supplementary piston, and said boosting factor is attained by stepping said supplementary piston.

9. A method as defined by claim 1, further comprising the step of delivery trigger signals to said at least one magnetic valve carrying the pressure medium to the supplementary piston is effected in a clocked manner in accordance with braking pressure deviation from the set-point characteristic curve.

10. A method as defined by claim 9, comprising the further step of evaluating a duty cycle of said trigger signals in order to recognize improper bleeding of the at least one brake circuit.

11. A method as defined by claim 9, further comprising evaluating said deviation from said set-point characteristic curve and supplying an indication of said deviation to signify a brake circuit failure and optionally to trigger a warning light.

12. A method as defined by claim 1, comprising the further step of evaluating said characteristic curve in view of a speed of depression of the brake pedal, recognizing high pedal speeds, and shifting said set-point characteristic curve to a more steep slope in order to reduce a threshold response time of said vehicle brake system.

13. An apparatus for controlling and adapting brake pressure in a vehicle brake system, comprising a hydraulic brake booster provided with an associated pedal-actuated brake valve for feeding a pressure medium from a pressure medium supply means to at least one wheel brake cylinder in at least one closed brake circuit between said brake booster and said at least one wheel brake cylinder, at least one supplementary pump piston being provided in said at least one closed brake circuit between said brake booster and said at least one wheel brake cylinder, said supplementary pump piston being provided with pressure supply and pressure withdrawal lines for regulating its supply of brake pressure and said supplementary pump piston has a pressure supply line for pressurizing said pressure chamber to a booster chamber of the hydraulic brake booster and said supplementary pump piston further has a return line connected via a second magnetic valve to the pressure medium supply means for depressurizing said pressure chamber, and said pressure supply and return lines include throttle means therein.

14. An apparatus as defined by claim 13, further wherein said supplementary piston comprises a stepped piston for increasing pressure delivery for anti-skid braking purposes. and converting it into an electric signal and at least one of said booster piston and said brake pedal is provided with a travel transducer for shaping characteristic curves, especially those having non-linear courses.

15. An apparatus as defined by claim 13, further wherein the brake booster includes a tandem master cylinder having two main pistons, each piston supplying a closed brake circuit, said brake booster further including a booster housing containing a booster piston which concentrically and annularly surrounds a brake valve, said booster piston being provided with a piston rod extension driving one of said main pistons.

16. An apparatus as defined by claim 15, further wherein the brake valve in the booster piston is driven by a brake pedal connected to a pressure piece provided with an enlarged head, said pressure piece being disposed in the booster chamber so that pressure fed into said booster chamber generates feedback upon the brake pedal via the brake valve.

17. An apparatus as defined by claim 13, further wherein said at least one brake circuit is provided with at least one 2/2-way magnetic valve disposed in a pressure output line from the brake booster preferably downstream of the supplementary piston said 2/2-way magnetic valve being actuatable selectively for purposes of anti-skid braking.

18. An apparatus as defined by claim 13, further wherein said at least one brake circuit includes a first magnetic valve group which when actuated blocks the brake booster by blocking outflow of pressure medium from a rear chamber of the booster piston.

19. An apparatus as defined by claim 13, further wherein said throttle means are linear throttles.

20. An apparatus for controlling and adapting brake pressure in a vehicle brake system, comprising a hydraulic brake booster provided with an associated pedal-actuated brake valve for feeding a pressure medium from a pressure medium supply means to at least one wheel brake cylinder in at least one brake circuit between said brake booster and said at least one wheel brake cylinder, at least one supplementary piston being provided in said at least one brake circuit between said brake booster and said at least one wheel brake cylinder, said supplementary piston being regulatable in its supply of brake pressure, and an electronic comparison and logic circuit is provided for detecting actual pressure values in the at least one brake circuit equipped with the at least one supplementary piston and for comparing said values selectively with a travel of at least one of a booster piston in the brake booster and a travel of a brake pedal, said logic and comparison circuit being arranged to deliver trigger signals selectively to a first magnetic valve to reduce pressure in a pressure chamber of the supplementary piston, said trigger signals serving to reproduce a predetermined set-point characteristic curve by clocking same against deviation from given set-point values and from regulatory deviation.

21. An apparatus as defined in claim 20, further wherein a characteristic curve shaping means is provided for generating a modified travel magnitude signal representing at least one of a booster piston travel and a brake pedal travel, whereby characteristic curve shaping and predetermining of set-point courses can be achieved.

22. An apparatus as defined by claim 21, further wherein said at least one braking circuit includes a differentiating member for evaluating a speed of depression of said brake pedal in order to shift said set-point characteristic curve, which member differentiates a travel extent of the booster piston and delivers a resultant value to the characteristic curve shaping means for supplementary variation of the travel magnitude signal.

23. An apparatus as defined by claim 21, further wherein said at least one braking circuit includes a differentiating member for evaluating a speed of depression of said brake pedal in order to shift said set-point characteristic curve, which member differentiates a travel extent of the brake pedal delivers a resultant value to the characteristic curve shaping means for supplementary variation of the travel magnitude signal.

24. An apparatus as defined by claim 20, further wherein said at least one brake circuit includes pressure transducers for detecting an actual pressure medium value and converting it into an electric signal and at least one of said booster piston and said brake pedal is provided with a travel transducer for shaping characteristic curves, especially those having non-linear courses.

25. An apparatus as defined by claim 20, further wherein said electronic comparison and logic circuit includes a first comparator for detecting a regulatory deviation in signal course in an upward direction and a second comparator for detecting a regulatory deviation in signal course in a downward direction, and based upon a resultant of comparison in said comparators, said electronic circuit selectively triggers a corresponding valve, one of which valves is associated with each of said comparators, to provide variation in braking pressure, and said electronic circuit further includes a third comparator to activate a warning device if there is a continuous regulatory deviation beyond a predetermined threshold value.

26. An apparatus for controlling and adapting brake pressure in a vehicle brake system, comprising a hydraulic brake booster provided with an associated pedal-actuated brake valve for feeding a pressure medium from a pressure medium supply means to at least one wheel brake cylinder in at least one brake circuit between said brake booster and said at least one wheel brake cylinder, at least one supplementary piston being provided in said at least one brake circuit between said brake booster and said at least one wheel brake cylinder, said supplementary piston being regulatable in its supply of brake pressure, said at least one brake circuit includes a first magnetic valve group which when actuated blocks the brake booster by blocking outflow of pressure medium from a rear chamber of the booster piston, and said at least one brake circuit includes a second magnetic valve group selectively operable to deliver pressure medium from a pressure supply means to a booster portion of the brake booster and to evacuate the booster chamber into a pressure medium return line.

27. An apparatus as defined by claim 26, further wherein said first and second magnetic valve groups are selectively triggerable to provide a desired braking pressure level where a pressure sought to be effected by the supplementary piston is inadequate, so that anti-skid braking modulation can still be effected.

28. An apparatus as defined by claim 26, further wherein a switchover magnetic valve is provided in said at least one braking circuit to deliver the pressure medium from the pressure supply means directly to the booster chamber of the booster housing to augment brake circuit pressure when desired for anti-skid regulation.

* * * * *